Jan. 11, 1966   J. R. HARRIS ETAL   3,229,248
DOUBLE CIRCUIT PRODUCTION OF SOUND ENERGY IN WATER
Original Filed Sept. 20, 1961
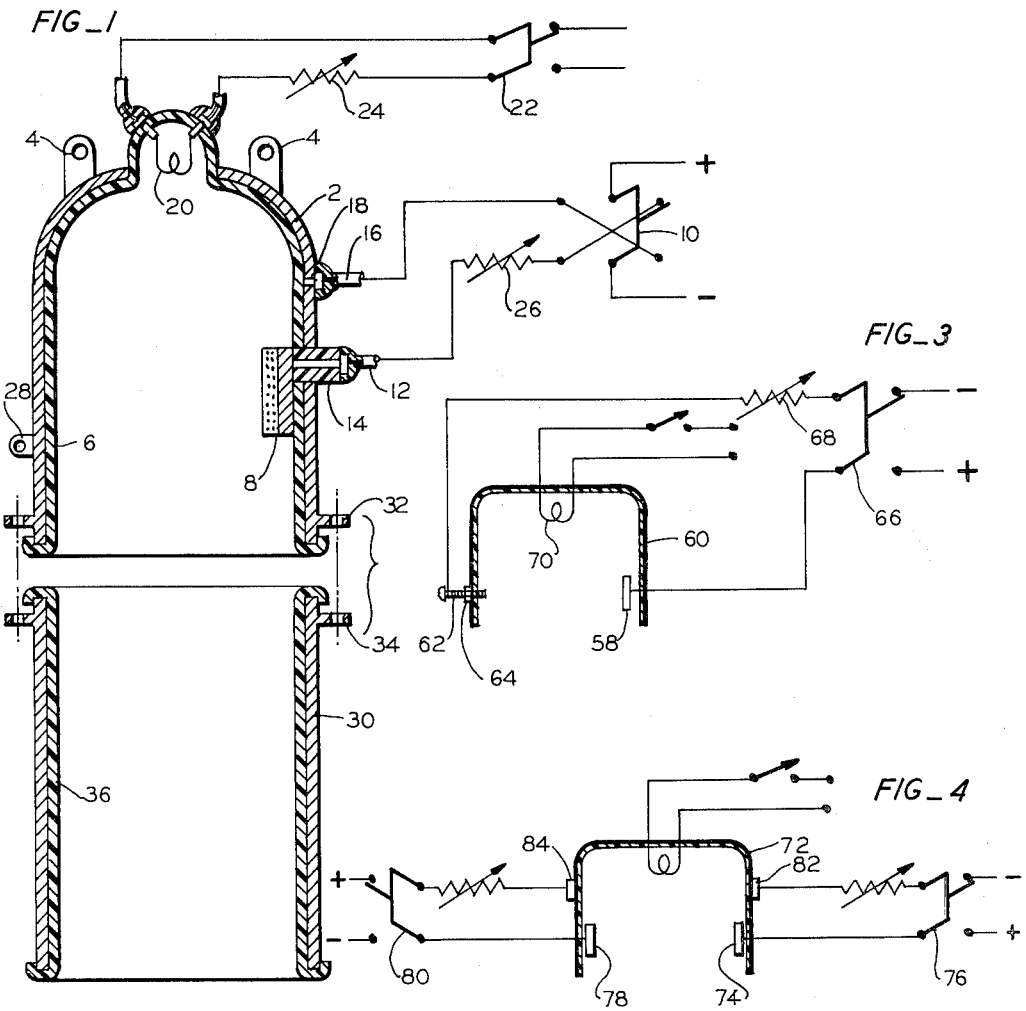
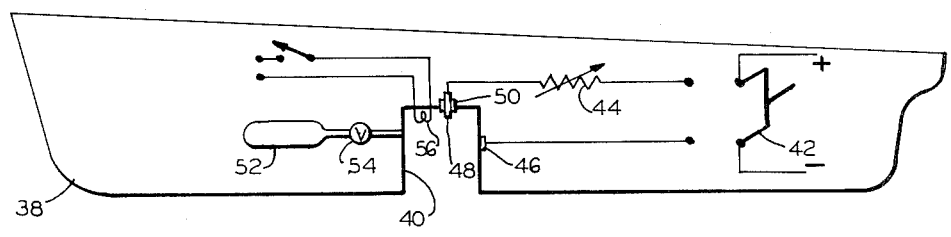
INVENTORS
JACK R. HARRIS
CLIFFORD M. RIGSBEE
BY Paul M. Klein Jr.
ATTORNEY United States Patent Office 3,229,248
Patented Jan. 11, 1966

3,229,248
DOUBLE CIRCUIT PRODUCTION OF SOUND ENERGY IN WATER
Jack R. Harris, United States Navy (1977 Mariposa, Seaside, Calif.), and Clifford M. Rigsbee, United States Navy (3048 Riviera Drive, Key West, Fla.)
Original application Sept. 20, 1961, Ser. No. 140,173. Divided and this application Aug. 1, 1963, Ser. No. 300,133
1 Claim. (Cl. 340—12)
(Granted under Title 35, U.S. Code (1952), sec. 266)

The invention described herein may be manufactured and used by or for the Government of the United States of America for governmental purposes without the payment of any royalties thereon or therefor.

This is a division of application Ser. No. 140,173, filed Sept. 20, 1961.

This invention relates to methods and apparatus for producing sound energy in water and more particularly to methods and apparatus for producing a hydrogen explosion in water.

In the prior art, sound energy has been used underwater for depth recording, detection of objects underwater, geophysical exploration, signaling, and the like. Where large amounts of sound energy are required, the prior art, as exemplified by U.S. Patent No. 1,500,243, has attempted to use a hydrogen explosion produced by conveying hydrogen and oxygen from stationary tanks to an underwater chamber for explosion ostensibly by electric spark. However, the prior art suffers from certain important defects which limit its use severely in practical situations. For a surface vessel and the more so for a submarine, airship, or helicopter, it is not feasible to carry a large supply of tanked hydrogen and oxygen which would be desirable for extensive sonar or signaling operations. Furthermore, it is frequently desirable for the explosion to work at considerable depths in the ocean and it is quite impractical for any of these vehicles, particularly for either of the aircraft, to attempt to carry and manipulate the long length of unwieldly armored tubing which would be required to conduct the gases down to the explosion chamber at a great depth. Additionally, there is no teaching in the prior art for practically controlling the frequency spectrum of the explosion, and certainly not with a single explosion chamber.

An object of the present invention is to provide methods and apparatus for accomplishing hydrogen explosions underwater without the need for conveying hydrogen from a storage tank to the explosion chamber.

Another object of the invention is to provide methods and apparatus for controlling the frequency spectrum of the explosion in an underwater explosion chamber.

Other objects and many of the attendant advantages of this invention will be readily appreciated as the same becomes better understood by reference to the following detailed description when considered in connection with the accompanying drawings wherein:

FIG. 1 is a somewhat schematic drawing showing a cross section of an explosion chamber and associated circuitry serving as a sound transmitter according to the present invention;

FIG. 2 is a schematic diagram of a ship showing a sound transmitting device formed as a chamber in the hull of the vessel;

FIG. 3 is a schematic diagram of an embodiment of the invention using a different circuit arrangement from that of FIG. 1; and FIG. 4 is another embodiment similar to those of FIG. 1 and FIG. 3 but using still another circuit arrangement.

The invention involves the production of sound energy in water by the explosion of a mixture of explosive gases, the frequency spectrum and pulse width being controlled by the configuration of the container of the gas mixture, the pressure (corresponding to the depth in water of the container) in the exploding gas and the mixture proportioning (i.e., the percent of oxidizing agent with reducing agent). A preferred embodiment of the invention contemplates the production of hydrogen and an oxidizing gas, such as oxygen and/or chlorine in a container immersed in sea water by electrolysis of the sea water. The invention operates well in an aqueous medium comprising essentially fresh water such as as found in lakes or the like. The container can be readily suspended from vehicles such as submarines, helicopters, or airships with the need for only electric cables in addition to suspending cables extending from the vehicle's D.C. power supply to the electrodes associated with the container.

Reference is now made to the drawing. FIG. 1 shows a preferred embodiment of an apparatus of the invention comprising a metal container 2 which can conveniently be made of steel. This container is provided with eyes such as 4 for the attachment of supporting cables depending from a ship, airship, helicopter, or the like, for lowering the container into the sea to any desired depth and thereafter removing it. The container 2 is provided with an insulating liner 6 which conveniently can be made of polyethylene. Also, many other suitable materials are available. The means for producing a combustible mixture of gases includes a platinum electrode 8, illustrated as, but not necessarily in the form of, a perforated plate. It is located so that gas evolved from it by electrolysis of the sea water occupies the container. The electrode is energized from any convenient source of D.C. power available from the vehicle carrying the apparatus. The power is transmitted to the electrode preferably through a reversing switch 10 for reversing the polarity of the electrode. The other electrode completing the electrolysis circuit is shown as being the steel container 2 itself. The current is conducted from the supply source to the platinum electrode 8 by an insulated cable shown broken away at 12, passing through an insulated connection 14 through the wall of the container 2. The other electrode, namely the chamber 2 itself, is supplied through another insulated cable 16 connected to the container 2 at 18.

For igniting the combustible mixture of gases it has been found preferable to use a hot wire, since at depths of even several hundred feet it is difficult and rather impractical to attempt to produce ignition by electric sparks. To maintain insulation of high-voltage cables for long distances through water would be a difficult matter. To avoid this problem by using low voltage from the support vehicle to a vibrator or transformer located at the explosion chamber poses the difficult problem of maintaining the vibrator or transformer sealed and free from crushing under the pressures involved. Therefore, the invention contemplates the use of a wire such as nichrome shown at 20 and supplied from any convenient source 22, which need be only low voltage sufficient to heat the wire 20 to a glowing state to cause ignition of the combustible gases. Control of the current to the wire 20 can be accomplished by any well-known means, a variable resistance being one example thereof shown at 24.

According to the invention, it has been discovered that one of the parameters determining the frequency spectrum of the sound produced by the explosion of gases is the proportion of burnable gas, typically hydrogen, in the gas mixture. The proportions of gases in the mixture are readily controlled according to the invention by the control of the time and current used for electrolysis. The current used for electrolysis can be varied in any known manner, such as by means of rheostat shown at 26. In carrying out a method of the invention, the switch 10 is thrown in a direction to make the electrode 8 negative, for example, and the current is allowed to flow for some desired length of time at a desired strength determined by experiment. During this period of time, hydrogen is generated at the electrode 8, and, the container 2 being immersed in water, displaces some water from the chamber in the interior of the container 2. During this interval, oxygen, and probably some chlorine, is generated at the other electrode, namely the container 2 itself. Since the interior of the container 2 is insulated by the material 6, the oxygen and chlorine generated during this interval are generated only at the exterior of the container and, if freed at all, simply escape into the sea and do not enter the interior of the container 2. After the desired interval of time for the generation of only hydrogen in the container 2, the switch 10 is reversed, making the electrode 8 positive and the steel container 2 negative. The electric current is then allowed to flow for the desired length of time to produce the desired proportion of hydrogen to oxygen within the chamber of the container 2. During this latter interval oxygen and possibly some chlorine are generated at the electrode 8, and hydrogen is generated at the exterior surface at the container 2 and escapes into the sea. When the desired mixture has been achieved in the container 2, the switch 10 is opened and the switch 22 is closed causing the wire 20 to glow and ignite the explosive mixture.

The explosion produces sound energy, as is known in the prior art, and this energy can be used for depth recording, detection of underwater objects, geophysical exploration, signaling, and the like. After the explosion, it is desirable to purge the chamber of the container 2 of any unburned gases so that the next explosion can be made to occur in a controlled fashion with known proportions of gases. A convenient method for purging the chamber is simply to tilt it from the generally vertical position shown in FIG. 1 sufficiently to enable all the gas to escape and the chamber to refill with water. This can be accomplished by pulling on a tilting cable which can be attached to the eye 28. Alternatively, an electromagnetically operated vent valve can be used, located at the top of the chamber.

The invention contemplates the control of the frequency content of the spectrum of the explosion and the pulse length by controlling the configuration of the container, the ratio of hydrogen to oxygen, the depth of the explosion, and the input energy which is related to the amount of gases being exploded. With a particular container, shaped essentially as shown in FIG. 1, it is possible, by changing the hydrogen to oxygen ratio, to vary the explosion from a sharp pulse of broad frequency content to a long pulse exhibiting nearly single frequency output. Pulse lengths varying from about 20 to over 500 milliseconds have been obtained with such an apparatus. A hydrogen-rich mixture gives a sharp pulse followed by an exponentially decaying sine wave, the frequency of which can be varied, by altering one or more of the other parameters, from a low frequency of the order of 30 cycles per second to frequencies of the order of hundreds of cps. When a nearly perfectly stoichiometric mixture is used, a large peak output is found with little decay.

By changing the depth at which the explosion is made to occur, the resonance frequency of the bubble after explosion can be changed along with the pulse shape itself. By changing the input energy, the output energy and the bubble frequency can be controlled. The input energy, as previously noted, is a function of the amount of gas being exploded, and this in turn is proportional to the product of the amount of electric current by the time during which the current flows.

One measure of the configuration of the container is the proportion of its length to its width. This ratio can easily be changed in many instances. For example, the configuration of the transducer of FIG. 1 can conveniently be varied by fastening an extension of any desired length to the container 2. Such an extension is shown at 30 and conveniently can be fastened to the container 2 by means of bolts (not shown) passing through mating flanges 32 and 34 on the container 2 and the extension 30, respectively. Insulation 36 in the extension 30 insures that only one gas at a time will be generated by electrolysis within the chamber of the transducer.

FIG. 2 shows schematically a ship 38 which could be a surface vessel or a submarine in which the transducer chamber is formed as a cavity 40 in the hull of the vessel itself. Preferably, this cavity is reinforced so as not to be damaged by the explosion of combustible gases. Electrolysis is carried out in the usual fashion using a D.C. supply through a switch 42 and a control rheostat 44. The wall of the cavity 40, typically being simply the steel plate of the hull, serves as the cathode by virtue of the connection of the terminal 46. Hydrogen is produced from the wall of the cavity serving as the cathode. In this instance, a steel electrode 48, insulated at 50 where it passes through the hull of the vessel, serves as the anode. Being steel, it combines with the oxygen generated by electrolysis, and essentially no free oxygen appears in the chamber 40. A combustion-supporting gas must therefore be introduced from elsewhere to facilitate explosion of the hydrogen, which is essentially a reducing agent. Such a gas, containing an oxidizing agent, can be supplied in the form of compressed air or the like admitted to the chamber 40 in the desired amount from a bottle 52 through a control valve 54. Ignition of the explosive mixture is accomplished by running a heating current through the wire 56. The chamber is purged after explosion by simply allowing it to flood with water.

The cavity 40 can be one especially formed in a vessel or it could be a torpedo tube, for example, in the case of a submarine. In such a case the configuration can readily be changed by providing a movable piston in the torpedo tube to vary the effective length of the cavity.

In FIG. 3 there is shown schematically another arrangement for controlling the proportion of hydrogen and oxygen in the transducer chamber. The transducer chamber is generally of the same type as shown in FIG. 1 with typically a steel shell lined with an insulating material. A platinum electrode 58 insulated from the container 60 serves as the anode for generating oxygen within the chamber and a cathode of adjustable surface area is positioned so that hydrogen evolved from it enters the transducer chamber at the same time as oxygen enters the chamber. A simple construction for the variable-area cathode is a screw shown at 62 with a lock nut 64 fastening it in position in contact with the wall of the transducer 60. By varying the length of that portion of the screw 62 which projects into the interior of the chamber 60, the ratio of hydrogen to oxygen can be exactly controlled. Current for this electrolysis system is supplied from the usual D.C. source from a switch 66 and rheostat 68. Ignition is by means of the wire 70 heated to the glow point.

In FIG. 4 is illustrated still another circuit arrangement for the production of a gas mixture of desired proportions in a transducer chamber 72. The chamber 72 is similar to the transducer of FIG. 1, being made of a typically steel shell with an insulating lining. In this case, two separate circuits are shown operating independently but simultaneously if desired, each for generating one gas within the transducer chamber. A platinum electrode 74 insulated from the wall of the chamber 72 is connected through switch 76 to form an anode for the production of oxygen in the chamber 72. An electrode 78, which may be steel or the like, and is insulated from the steel wall of the chamber 72, serves as a cathode, being supplied with direct current through the switch 80 for producing hydrogen in the chamber 72. Hydrogen evolved in the neighborhood of the connection 82 escapes into the sea and does not enter the interior of the chamber 72 to affect the gas mixture. Similarly, oxygen generated in the neighborhood of the connection 84 does not enter the chamber 72, but typically combines with the steel of the element 84 and the container 72. By varying the current strength and the time through the circuits of the electrodes in this embodiment, the proportion of the gases can be controlled.

It is seen from the foregoing description that controlling the materials of which the electrodes are made and controlling their location relative to the interior of the transducer chamber serves to prevent some of the gas generated by electrolysis of the water from appearing as free gas in the chamber. Thus in the embodiment illustrated in FIG. 2 the use of steel for the anode prevents free oxygen from appearing inside the chamber for the reason that oxygen generated by the electrolysis combines with the steel anode. In the embodiments of FIGS. 1, 3, and 4 the unwanted gas is prevented from appearing within the transducer chamber by locating the electrode which evolves it at the exterior of the chamber in such a position that gas evolved from it cannot bubble into the interior of the chamber.

It may be noted that the exterior electrode need not be attached to the transducer (although it is most practical to attach it thereto) but could be suspended in the water so long as it provides an adequate current path for electrolysis and does not evolve gas into the interior of the transducer.

Modifications of the invention can be made in view of the foregoing exposition. For example, the chamber 40 in FIG. 2 can be lined with insulation, which would in certain obvious cases extend beyond the boundaries of the chamber, and the embodiment of FIG. 2 could be used with electrode arrangements and circuitry similar to FIGS. 1, 3, and 4.

Obviously many other modifications and variations of the present invention are possible in the light of the above teachings. It is therefore to be understood that within the scope of the appended claim the invention may be practiced otherwise than as specifically described.

What is claimed is:

A method of generating by electrolysis of an aqueous medium into a container containing said aqueous medium, a mixture of oxidizing gas and hydrogen wherein the relative proportions of the two gases are predetermined which comprises passing through an electrode located in said aqueous medium in a position to evolve gas into said container a direct electric current in such a direction as to render said electrode positive to generate oxidizing gas thereat, said current being of a predetermined strength and being passed for a predetermined time, whereby a total predetermined charge is passed through said electrode, the quantity of oxidizing gas generated being a function of the said total charge; and passing through an electrode located in said aqueous medium in a position to evolve gas into said container, a direct electric current in such a direction as to render said electrode negative to generate hydrogen thereat;

said second current being of a predetermined strength and being passed for a predetermined time whereby a total predetermined charge is passed through said negative electrode, the quantity of hydrogen generated being a function of the said total charge;

said two electric currents being passed each in a circuit separate from the other through said two electrodes;

the ratio of said first-mentioned total charge to said second-mentioned total charge being predetermined to control the relative proportions of said gases.

References Cited by the Examiner

UNITED STATES PATENTS 1,500,243  7/1924  Hammond _____ 340—12
3,129,403  4/1964  Harter _____ 340—12

LEWIS H. MYERS, *Primary Examiner.*